US00RE40097E

(19) United States
(12) Reissued Patent
Erismann

(10) Patent Number: US RE40,097 E
(45) Date of Reissued Patent: Feb. 26, 2008

(54) GUITAR OR SIMILAR MUSICAL INSTRUMENT COMPRISING A DETACHABLE BODY SUPPORT

(76) Inventor: Mark Erismann, Kreuzackerstrasse 28, CH-5012, Schönenwerd (CH)

(21) Appl. No.: 11/057,855

(22) PCT Filed: Sep. 29, 1999

(86) PCT No.: PCT/CH99/00461

§ 371 (c)(1),
(2), (4) Date: Apr. 20, 2001

(87) PCT Pub. No.: WO00/25296

PCT Pub. Date: May 4, 2000

Related U.S. Patent Documents

Reissue of:
(64) Patent No.: 6,525,246
Issued: Feb. 25, 2003
Appl. No.: 09/830,012
Filed: Apr. 20, 2001

(30) Foreign Application Priority Data

Oct. 22, 1998 (CH) ..... 2135/98
May 5, 1999 (CH) ..... 0824/99

(51) Int. Cl.
*G10D 1/08* (2006.01)

(52) U.S. Cl. ..... 84/267; 84/267; 84/291; 84/327

(58) Field of Classification Search ..... 84/267, 84/291, 317
See application file for complete search history.

(56) References Cited

U.S. PATENT DOCUMENTS 1,342,202 A 6/1920 Cox
1,612,148 A 12/1926 Oettinger
2,239,985 A * 4/1941 Benioff ..... 84/726
3,413,883 A * 12/1968 Helbourne ..... 84/267
3,538,807 A * 11/1970 Francis ..... 84/267
3,771,408 A * 11/1973 Wright ..... 84/291
4,201,108 A * 5/1980 Bunker ..... 84/743
4,359,923 A * 11/1982 Brunet ..... 84/267
4,686,882 A * 8/1987 Shaw ..... 84/291
D299,453 S * 1/1989 Brunet ..... D17/20
5,000,071 A * 3/1991 Thomas ..... 84/327
5,029,796 A 7/1991 Schoenig
5,197,701 A 3/1993 Olson
5,251,526 A * 10/1993 Hill ..... 84/263
5,383,385 A 1/1995 Gilbert
5,390,578 A 2/1995 Raymer
5,945,622 A * 8/1999 Yamada ..... 84/731
5,994,633 A * 11/1999 Norton ..... 84/290
6,188,005 B1 * 2/2001 White ..... 84/291
6,525,246 B1 * 2/2003 Erismann ..... 84/267
6,646,189 B2 * 11/2003 Minakuchi ..... 84/291
6,664,461 B2 * 12/2003 Tamura ..... 84/743
6,791,022 B2 * 9/2004 Green ..... 84/731

FOREIGN PATENT DOCUMENTS

DE 1885390 1/1964
DE 8232675 5/1983

* cited by examiner

*Primary Examiner*—Lincoln Donovan
*Assistant Examiner*—Robert W. Horn
(74) *Attorney, Agent, or Firm*—Greenblum & Bernstein, P.L.C.

(57) ABSTRACT

Musical instrument including a removable guitar body having a front side arranged to bear at least one string, a frame-shaped body support comprising a plurality of supporting elements, and at least one supporting element arranged as a bracing element positionable between two opposite supporting elements of the frame-shaped body support. Releasable connection elements are arranged to releasably connect the guitar body to the support body and to the at least one supporting element. The plurality of supporting elements are removably couplable to each other to fold the frame-shaped body support into a space saving unit.

25 Claims, 5 Drawing Sheets

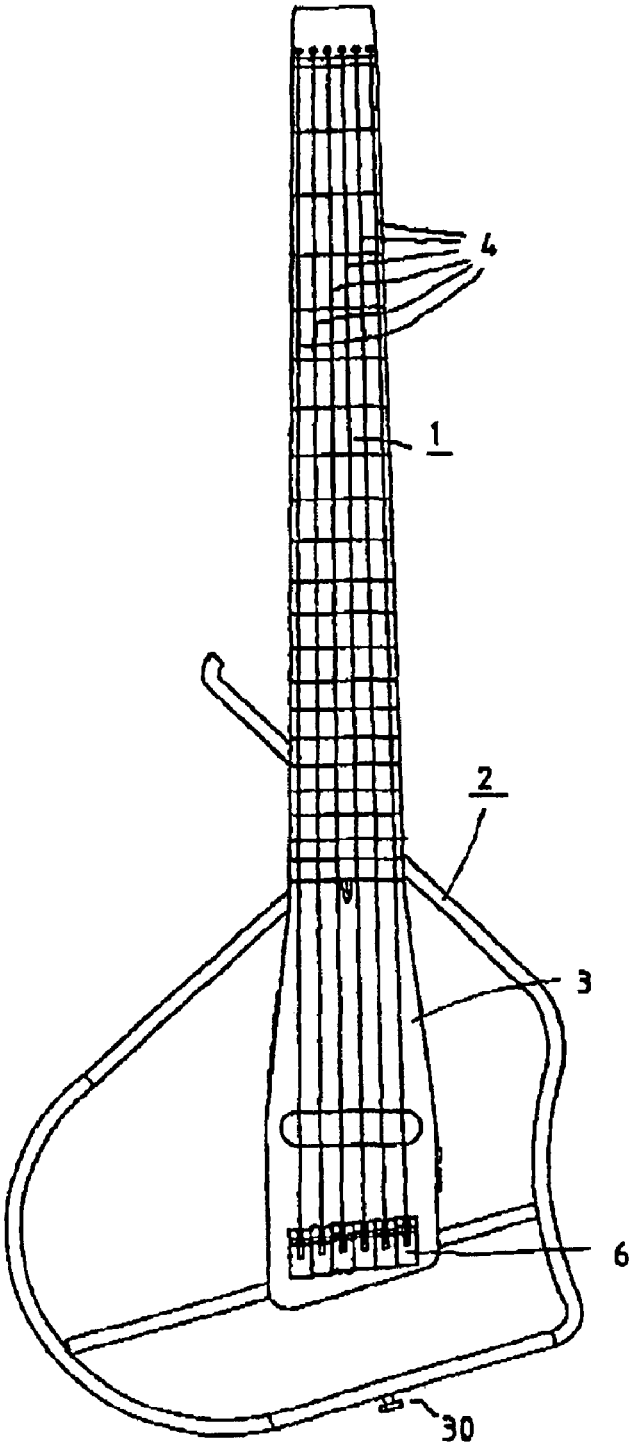
Fig. 1
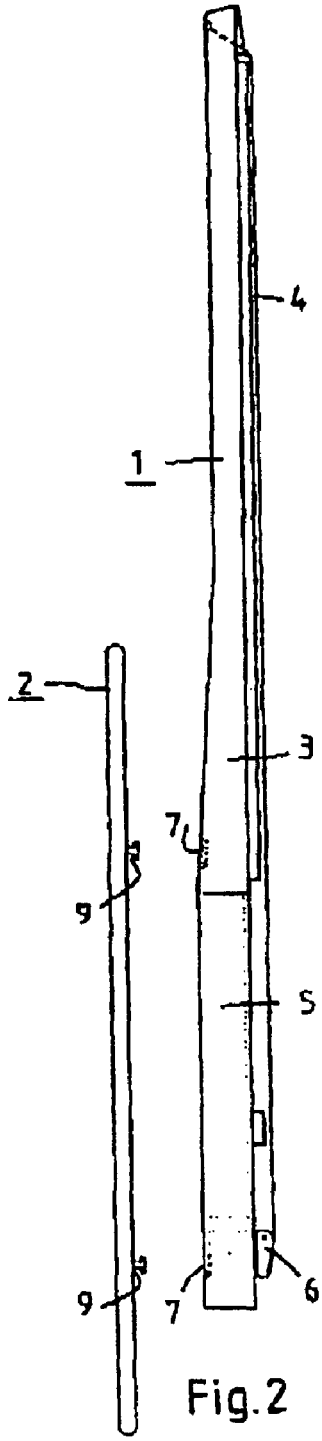
Fig. 2
Fig. 3

GUITAR OR SIMILAR MUSICAL INSTRUMENT COMPRISING A DETACHABLE BODY SUPPORT

Matter enclosed in heavy brackets [ ] appears in the original patent but forms no part of this reissue specification; matter printed in italics indicates the additions made by reissue.

CROSS-REFERENCE TO RELATED APPLICATIONS

The present application is a *reissue of U.S. Pat. No. 6,525,246, which is a* U.S. National Stage of International Application No. PCT/CH99/00461 filed Sep. 29, 1999, and claims priority under 35 U.S.C. §119 of Swiss Patent Application Nos. 2135/98 filed Oct. 22, 1998 and 824/99 filed May [4] *5*, 1999.

BACKGROUND OF THE INVENTION

1. Field of the Invention

The present invention relates to a guitar or musical instrument of that kind having a removable, frame-shaped body support which is formed from a plurality of rod-shaped supporting elements, and having a flat and comparatively narrow removable guitar body which bears at least one string on a front side.

2. Discussion of Background Information

German Utility Model DE-U-1885300 discloses an electric guitar of the type mentioned at the beginning having a frame-shaped body support. The frame-shaped body support includes two rod-shaped, bent parts which are plugged on both sides into the resonance box of the electric guitar and imitate the contours of a generally known guitar resonance body. The frame-shaped body support is designed in such a manner that it can be pulled out of the resonance box for transportation. The handling of this body support is comparatively simple, but it is fastened directly to the end of the resonance box of the guitar, comparatively close to the clamping mechanism of the strings. The resonance box therefore has to be of a sufficient length that on the one hand the plucking region of the electric guitar comes to lie at the ergonomically correct position with regard to the body support, and that on the other hand a possible carrying-strap fastening is able to comply with the ergonomic conditions, which is crucial when playing standing up. This guitar arrangement is particularly disadvantageous if there is a desire to use it in a traveling guitar having a comparatively short resonance box. This is because the guitar body has to extend over the full length of the body support fastened to the guitar body, in order to be able to fasten the removable body support to the end of the guitar body. The packing length of this guitar is determined by the relatively long length of the guitar body. In its state ready for traveling, this guitar is comparatively long and therefore unfavorable for transportation.

German utility model DE-U1-8232675 discloses a further electric guitar having a frame-shaped body support. In this electric guitar the body support which imitates the contours of a generally known guitar resonance body also includes two rod-shaped, bent parts which are plugged on both sides into the resonance box of the electric guitar. In this electric guitar, a resonance box extended by a piece of wood is provided in order, on the one hand, to be able to plug in the two halves of the body support at the end of the resonance box extended by the block of wood in accordance with the ergonomic conditions when the guitar is ready for playing, and, on the other hand, in order to be able to transport the electric guitar with a comparatively small resonance box with the block of wood removed. This electric guitar is complicated when changing between the state in which it is ready for playing and the transportation state. In the transportation state with the block of wood detached, care has to be taken that the loosened and no longer clamped strings are not damaged or even become tangled up. For these reasons, this electric guitar is disadvantageous as a traveling guitar.

SUMMARY OF THE INVENTION

The present invention provides a guitar of the type mentioned at the beginning which, for a guitar having a comparatively short removable guitar body, has a lightweight, removable body support which can be packed in a space-saving manner for transportation, but ensures sufficient, mechanical stability and an ergonomically correct body rest when playing the guitar, and which is simple to handle and is cost-effective.

According to the invention, the removable body support is composed of a plurality of molded, rigid, rod-shaped supporting elements resulting in an inherently stable, frame-shaped body support and is fastened to the guitar body by releasable connections, and by the body support which is fastened to the guitar body projecting beyond the end of the guitar body. At least one supporting element, which serves as a bracing element, is fastened to the guitar body by releasable connections provided between the two opposite, lateral supporting elements of the frame-shaped body support, and by the body support, after being detached from the guitar body and after the mutual position of the individual, adjacent, rod-shaped supporting elements is changed, being able to be folded up to form a space-saving unit. The body support which is composed of the rigid, rod-shaped supporting elements has sufficient mechanical stability, so that the guitar bears firmly against the body during playing. The frame-shaped body support is attached to the guitar body of the guitar by releasable connections, with the result that it can be removed and fastened again in a simple manner. By virtue of the fact that the removable body support projects beyond the end of the guitar body, a guitar body, which is as short as desired in practice, can be equipped with the body support, in which case the plucking position of the guitar remains at the ergonomically correct position with regard to the body support which is decisive for it, irrespective of the length of the guitar body. The body support, which is at a distance from the guitar body, is composed of a plurality of rigid supporting elements which can be folded up in a space-saving manner for transportation. The body support is cost-effective and simple to handle.

The rod-shaped supporting elements are advantageously tubes which can be fitted into one another. The use of tubes results in sufficient flexural strength at a comparatively low weight.

The rod-shaped supporting elements can be fastened to one another partly by link joints which can be folded in the plane of the frame-shaped body support and partly by plug-in connections. This design variant of the body support forms a favorable development because when preparing the body support for transportation the link joints only have to be folded in a simple manner.

Advantageously fastened in the two hollow spaces in the end regions, which can be fitted into one another, of in each case two adjacent tubes are the two ends of a cord which, after the plug-in connection is released, keeps the adjacent tubes spaced apart next to one another in a non-confusable and captive manner. For this reason, this arrangement is advantageous because after release of the plug-in connections between the individual tubes, the tube ends remain at least loosely stuck together, with the result that searching for the tube ends which go together is eliminated during re-assembly. This measure makes the handling of the body support substantially easier. The cords lying between the tube ends which go together are advantageously elastic.

There can be a link joint between two tubular supporting elements, whose linkage point, when the body support is used, is designed such that it can be pushed into the one end region of the two mutually facing, tubular supporting elements until they come into contact, and is designed such that it can be pulled out of it, when the body support is folded up, until the linkage point is exposed. When the body support is used, this releasable connection between two supporting elements produces a visually advantageous, infinitely variable intersection between the supporting elements. When folding up the body support, by pulling apart the two abutting supporting elements, the linkage point of the link joint can be exposed and the body support can be folded in a plane at the linkage points and therefore folded up effortlessly. In this case, a stop which, when the body support is folded up, permits the linkage point to be pulled out, but prevents the supporting elements from sliding apart, can be provided in at least one of the mutually facing, tubular supporting elements. The stop prevents the mutually facing end regions of the supporting elements from unintentionally sliding apart and a subsequent, laborious search for the end regions which go together.

The present invention is directed to a musical instrument that includes a resonance box having a front side arranged to bear at least one string, a frame-shaped body support comprising a plurality of supporting elements, and at least one supporting element arranged as a bracing element positionable between two opposite supporting elements of the frame-shaped body support. Releasable connection elements are arranged to releasably connect the resonance box to the support body and to the at least one supporting element. The plurality of supporting elements are removably couplable to each other to fold the frame-shaped body support into a space saving unit.

In accordance with a feature of the instance invention, the resonance box includes a substantially flat shape and is more narrow than a width of the frame-shaped support body when the resonance box is coupled to the frame-shaped support body, and the plurality of support elements include a plurality of molded, substantially rigid, rod-shaped elements.

According to another feature of the invention, the supporting elements include tubes which can be fitted into one another.

Further, a portion of the supporting elements are fastened to one another by link joints which can be folded in a plane of the frame-shaped body support and another portion of the support elements are fastened to each other by plug-in connections.

At least one cord is provided which runs through the frame-shaped support body so that, when the coupling between the support elements are removed, a connection between the support elements remains via the at least one cord. The cord is fastened in two hollow spaces in end regions of support elements which can be fitted into one another, and wherein the removable coupling is a plug-in connection. The cords are elastic.

A link joint is positioned between two supporting elements. The link joint has a linkage point, such that, when the frame-shaped support body is opened to support the resonance box, the link joint is pushed into end regions of the two supporting elements, and, when the frame-shaped support body is being folded up, the two supporting elements are pulled apart until the link joint is exposed between the end regions. A stop is provided in at least one of two mutually facing support elements. When the frame-shaped support body is folded up, the stop permits the linkage point to be pulled out, but prevents the supporting elements from sliding apart.

The releasable connection elements include a recess coupled to the resonance box adapted to receive a screw cap coupled to the frame-shaped support body.

Further, the releasable connection elements comprising a recess coupled to the resonance box adapted to receive a screw cap coupled to the at least one supporting element.

In accordance with yet another feature of the present invention, the musical instrument is a guitar.

BRIEF DESCRIPTION OF THE DRAWINGS

In the following, exemplary embodiments of the invention are described in greater detail with reference to the attached drawings, in which:

FIG. 1 shows a guitar provided with a body support, in plan view,

FIG. 2 shows the same guitar in a side view without a body support,

FIG. 3 shows the body support removed from the guitar, in side view,

DETAILED DESCRIPTION OF THE PRESENT INVENTION

Figure 4:
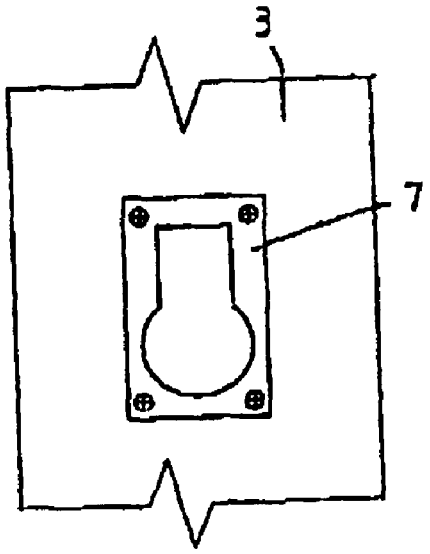
FIG. 4 shows the securing plate attached to the resonance box of the guitar, in plan view.

In FIG. 1, an electrical guitar 1 having a removable body support 2 is illustrated. The electric guitar can be any type of guitar, for example a ukulele, bass guitar etc. The guitar body 3 of the electric guitar 1 is flat and narrow and bears the strings 4 of the electric guitar 1 on its front side. FIG. 2 shows the side view of the electric guitar 1. A tone-detecting device 5 (only indicated roughly in FIG. 2) is accommodated in the interior of the guitar body 3. The strings 4 are secured to the upper end of the electric guitar 1. A tuning and clamping device 6 for each string 4 is situated at the lower end of the electric guitar 1. The tuning and clamping device 6 is not described in greater detail here; any known device can be selected for this purpose.

The guitar body 3 of the electric guitar 1 can be kept relatively short with strings 4 secured to the upper end and by the strings 4 guided at the lower end through a tuning and clamping device 6. In order to be able to play this electric guitar 1 in a manner such that it bears against the body, a body support 2, which is suitable for packing for traveling, is necessary. The body support 2 projects beyond the end of the guitar body 3 so that the plucking position of the guitar lies at the ergonomically correct position with regard to the end of the body support 2 bearing against the body. The assembled body support 2 is an independent, rigid unit. The body support 2 can be detached, for packing for traveling, from the guitar body 3 of the electric guitar 1 (which can be seen in FIG. 2), as FIG. 3 shows. The fastening elements between the guitar body 3 of the electric guitar 1 and the removable body support 2 are described with reference to FIGS. 4 to 7.

FIG. 4 shows a cut-out of the guitar body 3 of the electric guitar 1 with a screwed-on securing plate 7 which has a keyhole opening.

Figure 5:
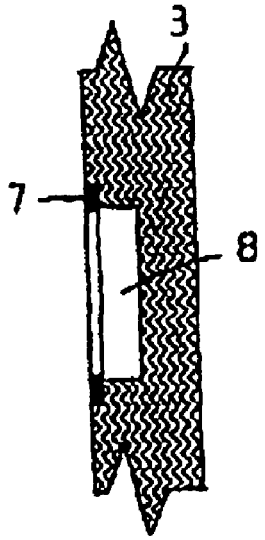
FIG. 5 shows the said securing plate in section.
Figure 6:
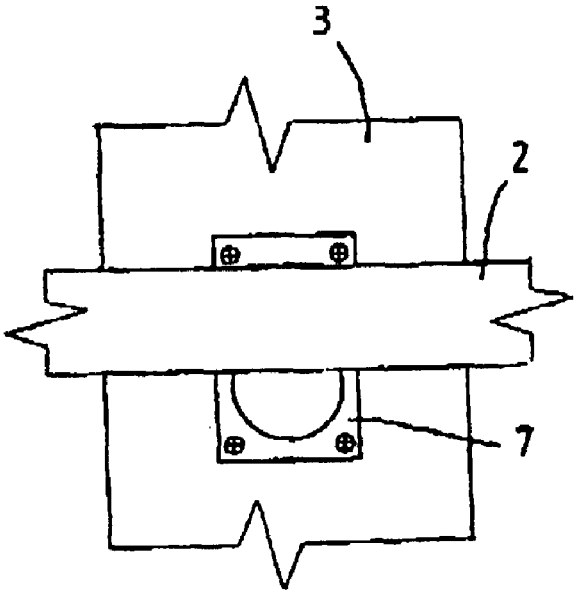
FIG. 6 shows the same securing plate having a rod-shaped supporting-element part in plan view.
Figure 7:
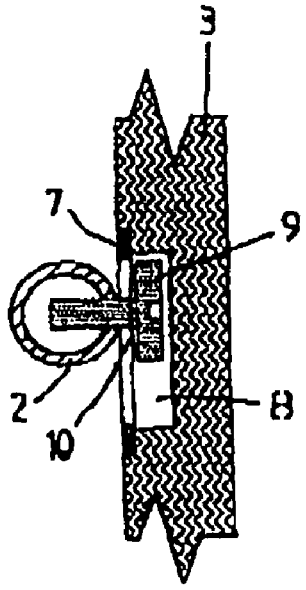
FIG. 7 shows the said securing plate in section.

FIG. 5 illustrates the cross section of this arrangement. The recess 8 in the guitar body 3, which recess lies behind the securing plate 7, is readily visible here. In FIG. 6, the arrangement just described is illustrated together with part of the removable body support 2. The interaction of the fastening elements can be seen in the cross-sectional drawing in FIG. 7. Fastened to the removable body support 2 is a cap screw 9 whose cap grips behind the keyhole opening in the securing plate 7 after being pushed in. A spring pad 10 present under the cap of the screw 9 ensures a snug connection between the securing plate 7 and cap screw 9. The body support 2 can thereby be fastened to the guitar body 3 of the electric guitar 1 in an easily removable manner, as is also indicated in FIGS. 2 and 3.

Figure 8:
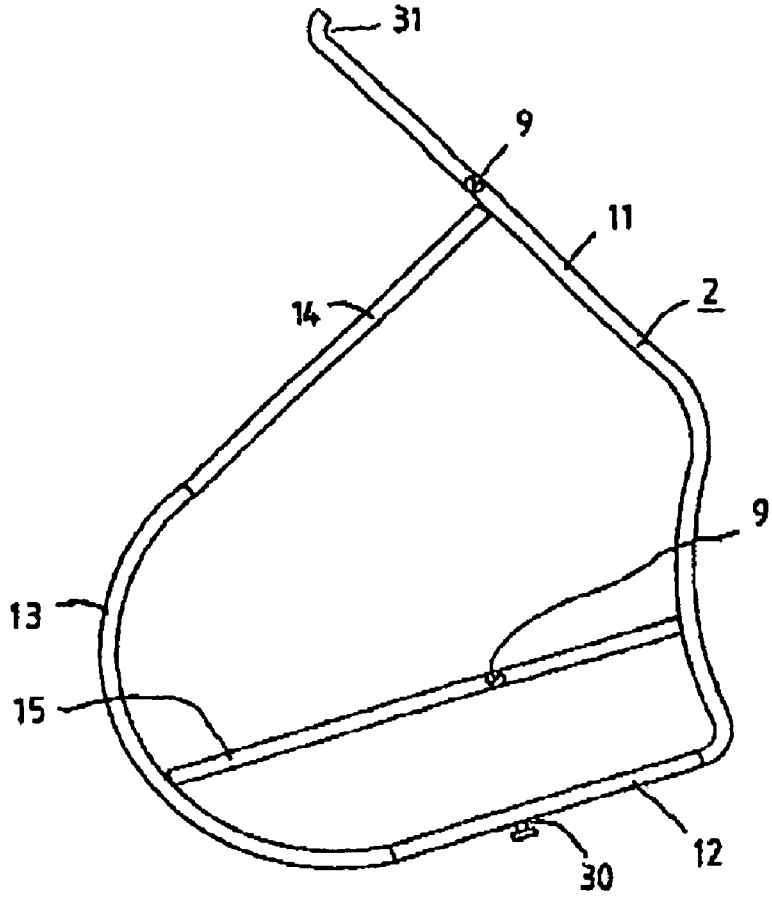
FIG. 8 shows the assembled body support, in plan view.
Figure 9:
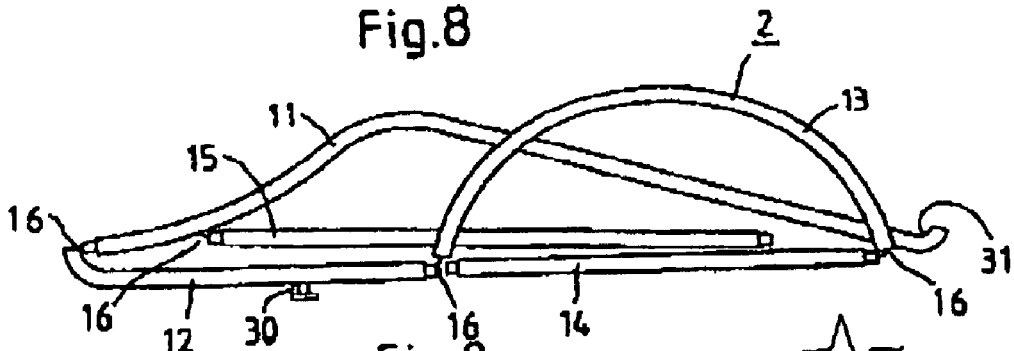
FIG. 9 shows the same body support folded up for transportation.

FIG. 8 shows a body support 2 detached from the electric guitar 1, in plan view. This body support 2 is composed of a plurality of rigid, rod-shaped supporting elements 11, 12, 13, 14 and 15. Releasable plug-in connections are present between the individual supporting elements 11, 12; 12, 13; 13, 14; 11, 14; and 11, 18 which are designed as tubes. The supporting element 15 lies between the two lateral supporting elements 11 and 13 and serves here as a bracing element. This supporting element 15 can be fastened to the guitar body 3 by the releasable connecting elements 7, 9 and thereby ensures that the part of the body support 2 which projects beyond the guitar body 3 has sufficient stability. After release of the plug-in connections, the body support 2 can be folded up into a space-saving unit (illustrated in FIG. 9) for transportation. A carrying strap (not illustrated) for the electric guitar 1 can be connected to the peg 30, which is attached to the body support 2, and to the end 31 of the supporting element 11. The carrying strap, which can be fastened to that part of the body support 2 which projects beyond the guitar body 3, ensures the ergonomically correct position of the plucking position of the guitar 1 when playing while standing up.

Figure 10:
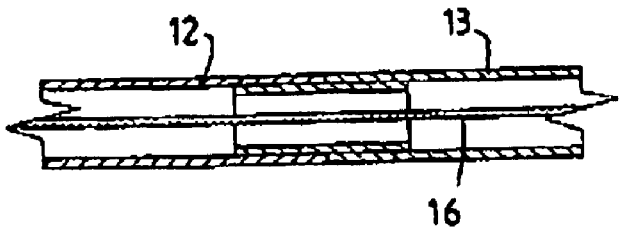
FIG. 10 shows the tube ends fitted into one another of two supporting elements with an inserted cord, in longitudinal section.
Figure 11:
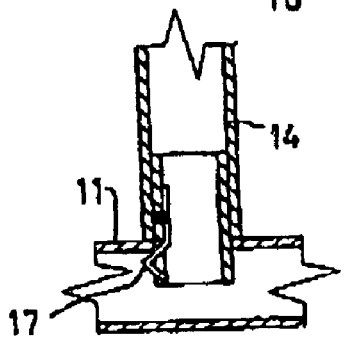
FIG. 11 shows the end region of a supporting element which is provided with a snap-in projection and is plugged into a hole in another supporting element, in section.

FIGS. 10 and 11 show plug-in connections in section. The plug-in connection which can be seen in FIG. 10 lies between two adjacent supporting elements 12 and 13. The plug-in connection is secured by a snug fit. Fastened in the two hollow spaces in the tubular supporting elements 12, 13 are the two ends of a cord 16 which, after the plug-in connection is released, keeps the supporting elements 12, 13 spaced apart next to one another in a non-confusable and captive manner. After release of the plug-in connections, the cords 16 keep those end regions of the tubular supporting elements 11, 12, 13, 14, 15 which go together for a plug-in connection stuck loosely to one another. An elastic cord 16 makes it easier to work with the supporting elements 11 to 15 when detached from one another. By this measure, when the body support 2 is re-assembled it is not necessary to search for the halves of each plug-in connection which go together. In FIG. 11, the plug-in connection between the tubular supporting elements 11 and 14 is illustrated in section. The tube end of the supporting element 14 is provided with a resilient snap-in projection 17. The snap-in projection 17 grips behind the edge of the hole in the supporting element 11 and thereby secures the plug-in connection against slipping apart.

Figure 12:
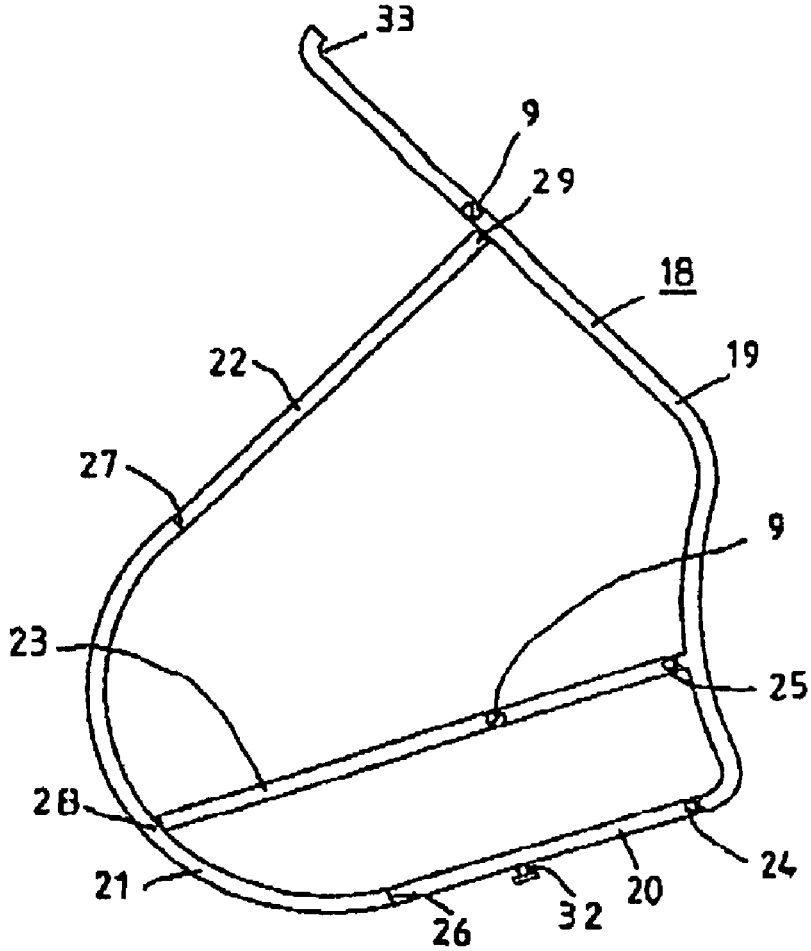
FIG. 12 shows an assembled body support partly with link joints and partly with plug-in connections between the supporting elements, in plan view.
Figure 13:
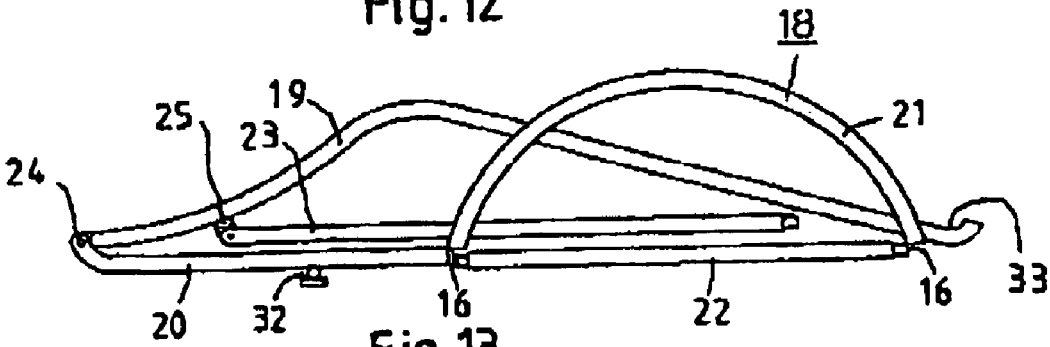
FIG. 13 shows the same body support folded up for transportation.
Figure 14:
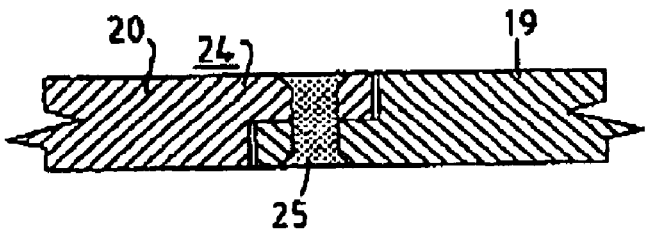
FIG. 14 shows the longitudinal section of a link joint.
Figure 15:
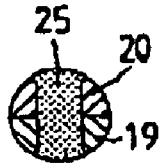
FIG. 15 shows the cross section of the same link joint.

FIG. 12 shows a further design variant of the body support 18. This body support 18 is composed of the supporting elements 19, 20, 21, 22 and 23. The supporting element 23 serves again as a bracing element between the two opposite, lateral supporting elements 19, 21 of the body support 18. This stable body support 18 is fastened to the guitar body 3 by the releasable connections 7, 9. FIG. 13 shows this body support 18 in the folded-up state ready for transportation. The rigid, rod-shaped supporting elements 19 to 23 are fastened to one another partly by link joints 24, 25 which can be folded in the plane of the frame-shaped body support 18 and, partly by plug-in connections 26, 27, 28, 29. The plug-in connections 26, 27, 28, 29 are designed similarly to the way illustrated in FIGS. 10 and 11 and also described there with reference to these figures. A carrying strap (not illustrated) for the electric guitar 1 can be connected to the peg 32, attached to the supporting element 20, and to the end 33 of the supporting element 19. The peg 32, which is attached to the body support 18 and is used for the carrying-strap fastening, does not bear against the guitar body 3 and therefore, when the guitar body 3 is comparatively short, can fulfil the ergonomic conditions for the carrying strap. The link joint 24 is shown in longitudinal section in FIG. 14 and in cross section in FIG. 15. The link joint 25 is of similar design. The rod-shaped supporting elements 19 and 20 (shown in FIG. 14) are formed such that they overlap and are held together in an articulated manner by a rivet 28.

Figure 16:
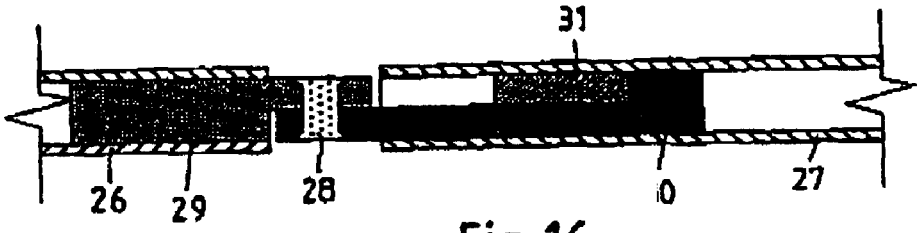
FIG. 16 shows the end regions of two supporting elements with a linkage point, with supporting elements pulled apart, FIG. 17 [with] *shows* supporting elements pushed together.
Figure 17:
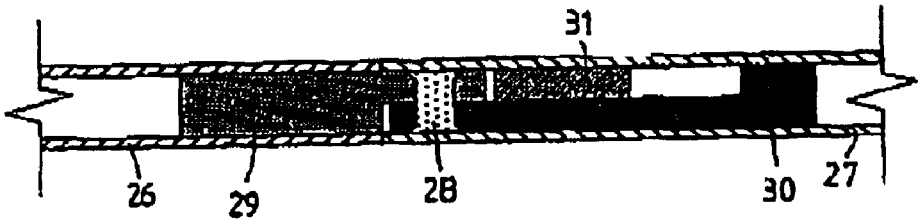
Figure 18:
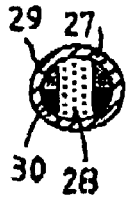
FIG. 18 shows the cross section over the linkage point of the linkage point shown in FIG. 17.

In FIGS. 16, 17, and 18, a further, releasable connection between two supporting elements 26, 27 is illustrated. A link joint having the linkage point 28 is arranged between the supporting elements 26, 27. The supporting element 26 contained a closely fitting peg 29 which constitutes an extension of the supporting element 26. The other supporting element 27 is extended as far as the linkage point 28 by the slide 30 which can be displaced longitudinally in the supporting element 27. The stop 31, which is fastened in the supporting element 27, prevents the supporting elements 26 and 27 from unintentionally sliding apart.

After being pulled part, the supporting elements 26 and 27 can, as is illustrated in FIG. 16, be folded in a plane about the linkage point 28. A body support (not illustrated in greater detail) having releasable connections of this type between the supporting elements 26, 27 can be folded up in a plane in a simple manner. When the body support is used, the supporting elements 26, 27 are pushed together until they come into contact, as is shown in FIG. 17. In this state, the linkage point 28 is concealed in the supporting element 27. The tubular supporting elements 26 and 27 butt against one another in an infinitely variable manner, guided by the slide 30 and stop 31 lying within them, and give a visually advantageous impression. The peg 29 lying in the tubular supporting element 26 and the slide 30 which is connected thereto confer an advantageous flexural strength on the butt-jointed connecting point. This arrangement is a favorable combination of a plug-in connection with a link connection.

What is claimed is:

1. A musical instrument comprising:

a removable guitar body having a front side arranged to bear at least one string;

a frame-shaped body support comprising a plurality of supporting elements;

at least one supporting element arranged as a bracing element positionable between two opposite supporting elements of said frame-shaped body support;

releasable connection elements arranged to releasably connect said guitar body to said body support and to said at least one supporting element, wherein said plurality of supporting elements are removably couplable to each other to fold said frame-shaped body support into a space saving unit; and wherein, when said musical instrument is in use, said plurality of supporting elements are arranged to form an ergonomic shape connected to said guitar body.

2. The musical instrument in accordance with claim 1, said removable guitar body comprising a substantially flat shape and being more narrow than a width of said frame-shaped *body* support [body] when said removable guitar body is coupled to said frame-shaped *body* support [body], and said plurality of [support] *supporting* elements comprising a plurality of molded, substantially rigid, rod-shaped elements.

3. The musical instrument in accordance with claim 1, wherein said *plurality of* supporting elements comprising tubes which can be fitted into one another.

4. The musical instrument in accordance with claim 1, wherein a portion of said *plurality of* supporting elements are fastened to one another by link joints which can be folded in a plane of said frame-shaped body support and another portion of said [support] *plurality of supporting* elements are fastened to each other by plug-in connections.

5. The musical instrument in accordance with claim 1, further comprising at least one cord which runs through said frame-shaped support body so that, when [the] coupling between said [support] *plurality of supporting* elements [are] *is* removed, a connection between [the support] *said plurality of supporting* elements remains via said at least one cord.

6. The musical instrument in accordance with claim 5, wherein said *at least one* cord is fastened in two hollow spaces in end regions of [support,] *said plurality of supporting* elements which can be fitted into one another, and wherein said [removable] coupling is a plug-in connection.

7. The musical instrument in accordance with claim 5, wherein said [cords are] *at least one cord is* elastic.

8. The musical instrument in accordance with claim 1, further comprising a link joint positioned between two supporting elements, said link joint having a linkage point, such that, when said frame-shaped *body* support [body] is [opened] *arranged* to support said removable guitar body, said link joint is pushed into end regions of said two supporting elements, and, when said frame-shaped *body* support [body] is being folded up, said two supporting elements are pulled apart until said link joint is exposed between said end regions.

9. The musical instrument in accordance with claim 8, further comprising a stop provided in at least one of two mutually facing [support] *supporting* elements, wherein, when said frame-shaped *body* support [body] is folded up, said stop permits said linkage point to be pulled out, but prevents said *two mutually facing* supporting elements from sliding apart.

10. The musical instrument in accordance with claim 1, said *at least one* releasable connection *comprising connection* elements, *one of the connection elements comprising a screw cap coupled to said frame-shaped body support and another of the connection elements* comprising a recess coupled to said [resonance box] *removable guitar body and* adapted to receive [a] *said* screw cap coupled to said frame-shaped *body* support [body].

11. The musical instrument in accordance with claim 1, said *at least one* releasable connection [elements] comprising a recess coupled to said removable guitar body *and* adapted to receive a screw cap coupled to said at least one supporting element.

12. The musical instrument in accordance with claim 1, said musical instrument being a guitar *having a plurality of guitar strings*.

*13. A musical instrument comprising:*

*a guitar body having a front side arranged to bear at least one string;*

*a frame-shaped body support comprising a plurality of supporting elements;*

*said guitar body being removably connectable to said frame-shaped body support;*

*at least one of said plurality of supporting elements arranged as a bracing element positionable between two opposite supporting elements of said frame-shaped body support, said bracing element being releasably connected to said two opposite supporting elements;*

*said guitar body being releasably connected to the bracing element of said frame-shaped body support via at least one releasable connection,*

*wherein said plurality of supporting elements are removably couplable to each other, whereby said frame-shaped body support is capable of assuming a space saving arrangement; and*

*wherein, when said musical instrument is in use, said plurality of supporting elements are arranged to form an ergonomic shape connected to said guitar body.*

*14. The musical instrument in accordance with claim 13, said guitar body comprising a substantially flat shape and being more narrow than a width of said frame-shaped body support when said guitar body is coupled to said frame-shaped body support, and said plurality of supporting elements comprising a plurality of substantially rigid elements.*

*15. The musical instrument in accordance with claim 13, further comprising a link joint positioned between two supporting elements, said link joint having a linkage point, such that, when said frame-shaped body support is arranged to support said guitar body, said link joint is pushed into end regions of said two supporting elements, and, when said frame-shaped body support assumes the space saving arrangement, said two supporting elements are pulled apart until said link joint is exposed between said end regions.*

*16. The musical instrument in accordance with claim 13, wherein said frame-shaped body support comprises a con-*

*necting arrangement for connecting a carrying strap to said frame-shaped body support, whereby an ergonomically correct position of the plucking position of the musical instrument is ensured when played while standing up.*

*17. The musical instrument in accordance with claim 16, wherein said connecting arrangement comprises a first connection for connecting the carrying strap to one part of said frame-shaped body support and a second connection for connecting the carrying strap to another part of the frame-shaped body support.*

*18. The musical instrument in accordance with claim 13, said frame-shaped body support projecting beyond one end of said guitar body.*

*19. A musical instrument comprising:*

*a guitar body having a front side arranged to bear at least one string;*

*a frame-shaped body support comprising a plurality of supporting elements;*

*said guitar body being removably connectable to said frame-shaped body support;*

*at least one of said plurality of supporting elements arranged as a bracing element positionable between two opposite supporting elements of said frame-shaped body support;*

*said guitar body being releasably connected to said frame-shaped body support via at least one releasable connection;*

*a link joint positioned between two supporting elements, said link joint having a linkage point, such that, when said frame-shaped body support is arranged to support said guitar body, said link joint is pushed into end regions of said two supporting elements, and, when said frame-shaped body support assumes the space saving arrangement, said two supporting elements are pulled apart until said link joint is exposed between said end regions; and*

*a stop provided in at least one of two mutually facing supporting elements,*

*wherein said plurality of supporting elements are removably couplable to each other, whereby said frame-shaped body support is capable of assuming a space saving arrangement;*

*wherein, when said musical instrument is in use, said plurality of supporting elements are arranged to form an ergonomic shape connected to said guitar body, and*

*wherein, when said frame-shaped body support assumes the space saving arrangement, said stop permits said linkage point to be pulled out, but prevents said two mutually facing supporting elements from sliding apart.*

*20. A guitar comprising:*

*a guitar body having a front side arranged to bear guitar strings;*

*a frame-shaped body support comprising a plurality of removably connected support elements; and*

*said guitar body being removably connected to said frame-shaped body support,*

*wherein, when said guitar is not in use, said frame-shaped body support is capable of assuming a space saving arrangement, and*

*wherein, when said guitar is in use, said plurality of support elements are arranged to form an ergonomic shape connected to said guitar body,*

*wherein at least one of the plurality of support elements is arranged as a bracing element positionable between opposite sides of said frame-shaped body support, said bracing element being removably connected to said guitar body via the at least one releasable connection.*

*21. A guitar comprising:*

*a guitar body having a front side arranged to bear guitar strings;*

*a frame-shaped body support comprising a plurality of removably connected support elements;*

*said guitar body being removably connected to a bracing element that is removably connected to two oppositely arranged support elements of said frame-shaped body support;*

*said guitar body contacting said frame-shaped body support at different locations; and*

*wherein, when said guitar is not in use, said frame-shaped body support is capable of assuming a space saving arrangement, and*

*wherein, when said guitar is in use, said plurality of support elements are arranged to form an ergonomic shape connected to said guitar body.*

*22. The guitar in accordance with claim 21, wherein said frame-shaped body support contacts said guitar body at different locations.*

*23. A guitar comprising:*

*a guitar body having a front side arranged to bear guitar strings;*

*a frame-shaped body support comprising a plurality of support elements removably connected to each other;*

*one of the plurality of support elements comprising a bracing element positionable between two opposite support elements of said frame-shaped body support;*

*said guitar body being removably connected to said frame-shaped body support via at least one releasable connection; and*

*said at least one releasable connection being arranged to connect said bracing element and said guitar body;*

*wherein, when said guitar is not in use, said frame-shaped body support is capable of assuming a space saving arrangement, and*

*wherein, when said guitar is in use, said plurality of support elements are arranged to form an ergonomic shape connected to said guitar body.*

*24. The guitar in accordance with claim 23, wherein said guitar body contacts said frame-shaped body support at different locations.*

*25. The guitar in accordance with claim 23, wherein said frame-shaped body support contacts said guitar body at different locations.*

* * * * *